Oct. 19, 1965 W. L. PETERSON ETAL 3,212,813
VEHICLE WITH EXTENSIBLE TOP
Filed July 27, 1964 6 Sheets-Sheet 1

INVENTORS
WILLIAM L. PETERSON
HERBERT DWAIN STUTZ
BY
m.a. Hobbs
ATTORNEY

Oct. 19, 1965 W. L. PETERSON ETAL 3,212,813
VEHICLE WITH EXTENSIBLE TOP
Filed July 27, 1964 6 Sheets-Sheet 3

INVENTORS
WILLIAM L. PETERSON
HERBERT DWAIN STUTZ
BY M. A. Hobbs
ATTORNEY

INVENTORS
WILLIAM L. PETERSON
HERBERT DWAIN STUTZ
BY M.A. Hobbs

ATTORNEY

Oct. 19, 1965     W. L. PETERSON ETAL     3,212,813

VEHICLE WITH EXTENSIBLE TOP

Filed July 27, 1964     6 Sheets-Sheet 5

INVENTORS
WILLIAM L. PETERSON
HERBERT DWAIN STUTZ
BY M. A. Hobbs
ATTORNEY

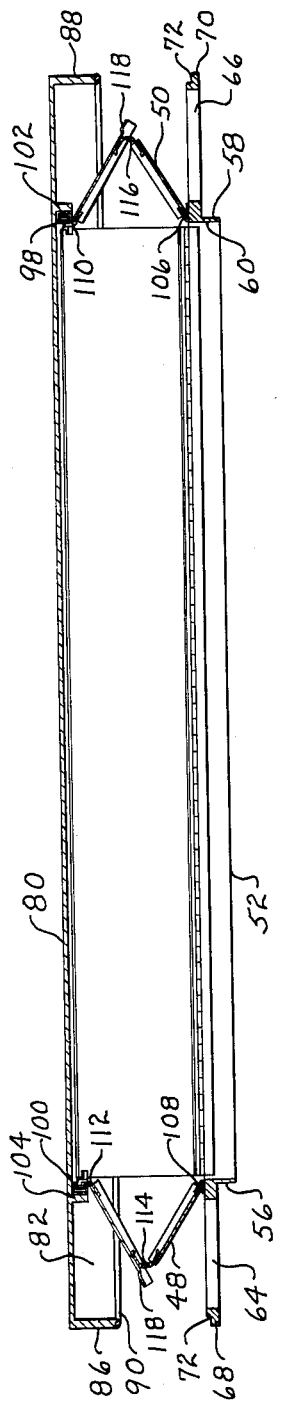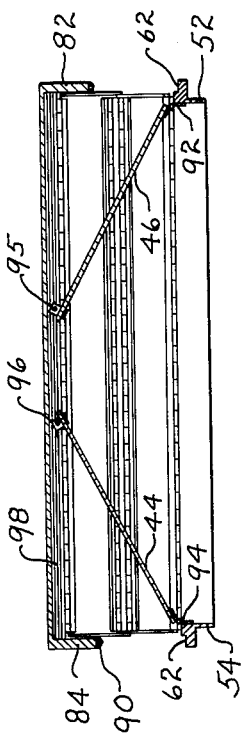

United States Patent Office 3,212,813
Patented Oct. 19, 1965

3,212,813
VEHICLE WITH EXTENSIBLE TOP
William L. Peterson and Herbert Dwain Stutz, Elkhart, Ind., assignors to Freeway Travelers, Inc., Elkhart, Ind., a corporation of Indiana
Filed July 27, 1964, Ser. No. 385,175
7 Claims. (Cl. 296—137)

The present invention relates to a vehicle and more particularly to a vehicle with an extensible top.

In recent years small buses and similar vehicles have become extensively used, often by families and small groups in traveling from one part of the country to another, using the vehicle for living quarters at night and stop-overs at vacation and recreation places. These small buses are not sufficiently tall to permit an adult to stand erect or to move comfortably from place to place in the vehicle. Various attempts have been made to make extensible roofs for these vehicles, but the structures resulting from these attempts have been mostly unsatisfactory in that they are often difficult to extend and retract and/or do not become effectively sealed in water tight relationship when folded or retracted. Further, since the extensible and retractable portions are rarely made and installed as a part of the original vehicle structure, the units previously used have generally been difficult to install without making substantial changes in the overall top structure of the vehicle. It is therefore one of the principal objects of the present invention to provide an extensible and contractable top for a road vehicle, which can readily be installed on a conventional vehicle after it has left the manufacturing plant and which can be easily operated or manipulated between folded and unfolded positions without the use of any special tools or equipment.

Another object of the invention is to provide an extensible top for a vehicle which encloses substantially all of the principal moving parts within the top thereof, and which effectively seals itself when in folded position to prevent water, dirt, grit, and other foreign materials from entering the extensible top portion of the vehicle.

Still another object of the invention is to provide a compact, relatively simple vehicle extensible top structure which, when in folded position, increases the height of the vehicle very little and is compatible with the lines and design of the overall vehicle, and which, when in the extended position, can be installed without substantially weakening or altering the structure of the original vehicle top.

Still another object of the invention is to provide an extensible top for a vehicle having a top panel adapted to give protection to the operating parts and side structure of the extensible top while the top is either in the folded or unfolded position, and having rigid walls with one or more windows which will effectively withstand severe weather conditions.

A further object of the invention is to provide an extensible top structure of the aforementioned type which provides adequate room in the vehicle for an adult individual to stand erect and sufficient height to the vehicle to permit the installation of a bunk bed or storage space when it is in its extended position.

Another object of the invention is to provide an extensible top which can be fully manufactured apart from the vehicle and shipped, stored, and installed without the use of any special tools, equipment or special skill, and which can be readily constructed using standard, readily available materials.

Additional objects and advantages of the invention will become apparent from the following description and accompanying drawings, wherein:

FIGURE 14 is a transverse vertical cross sectional view of the present extensible top, the section being taken on line 14—14 of FIGURE 3, showing the top in a partially folded position in the longitudinal direction;

FIGURE 15 is a vertical cross sectional view thru the extensible top, the section being taken on line 15—15 of FIGURE 3 showing the top in a partially folded position in the transverse direction.

Figure 1:
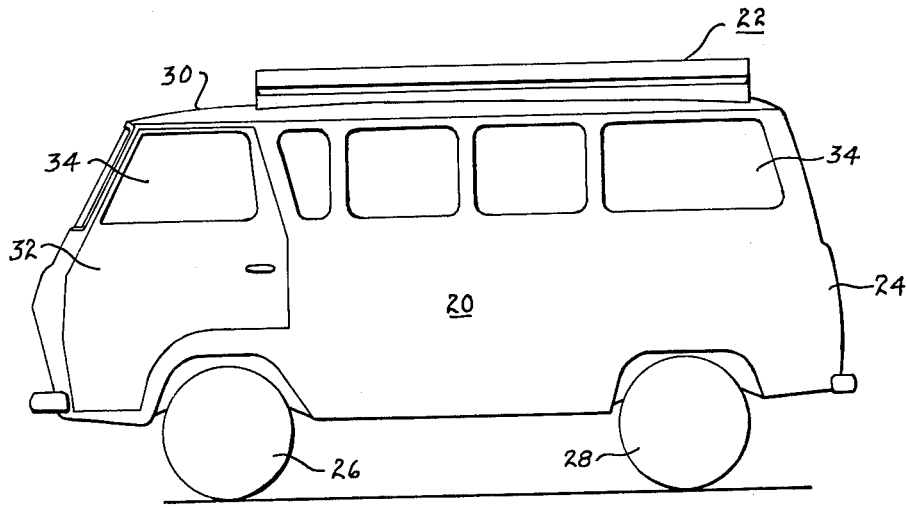
FIGURE 1 is a side elevational view of a small bus or the like on which the present extensible top has been mounted, showing the extensible top in its folded position.
Figure 2:
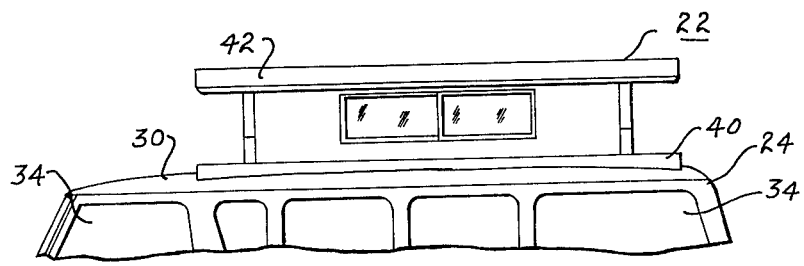
FIGURE 2 is a fragmentary view of the vehicle shown in FIGURE 1, showing the extensible top in its extended or unfolded position.
Figure 3:
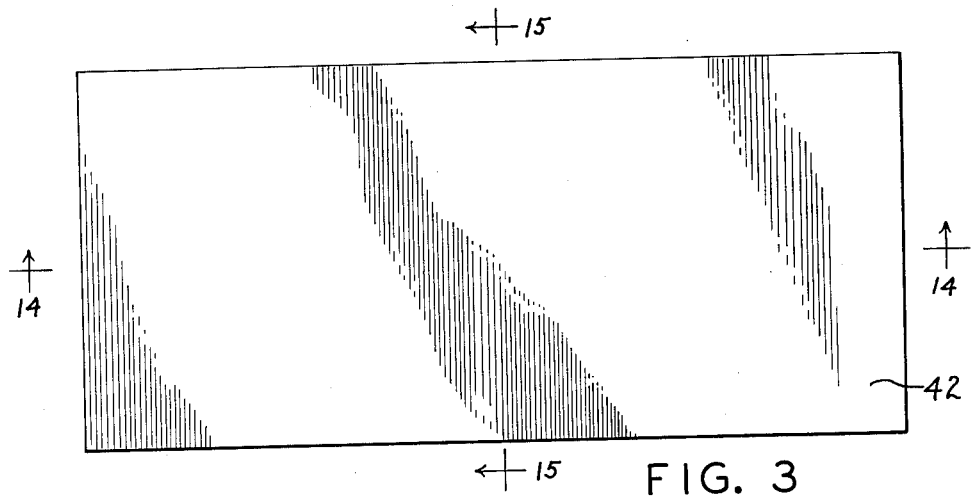
FIGURE 3 is a top plan view of the extensible top shown in FIGURES 1 and 2.
Figure 4:
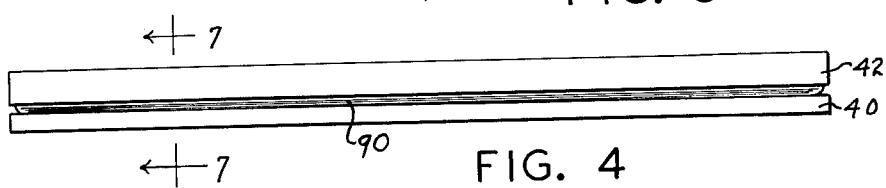
FIGURE 4 is a side elevational view of the extensible top showing it in its folded position.
Figure 5:
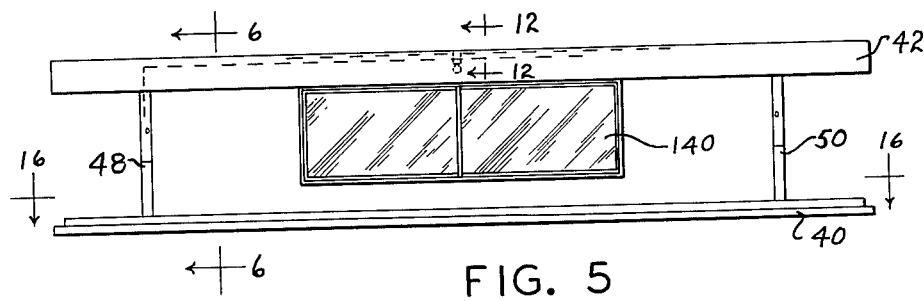
FIGURE 5 is a side elevational view of the extensible top showing it in its unfolded position.
Figure 6:
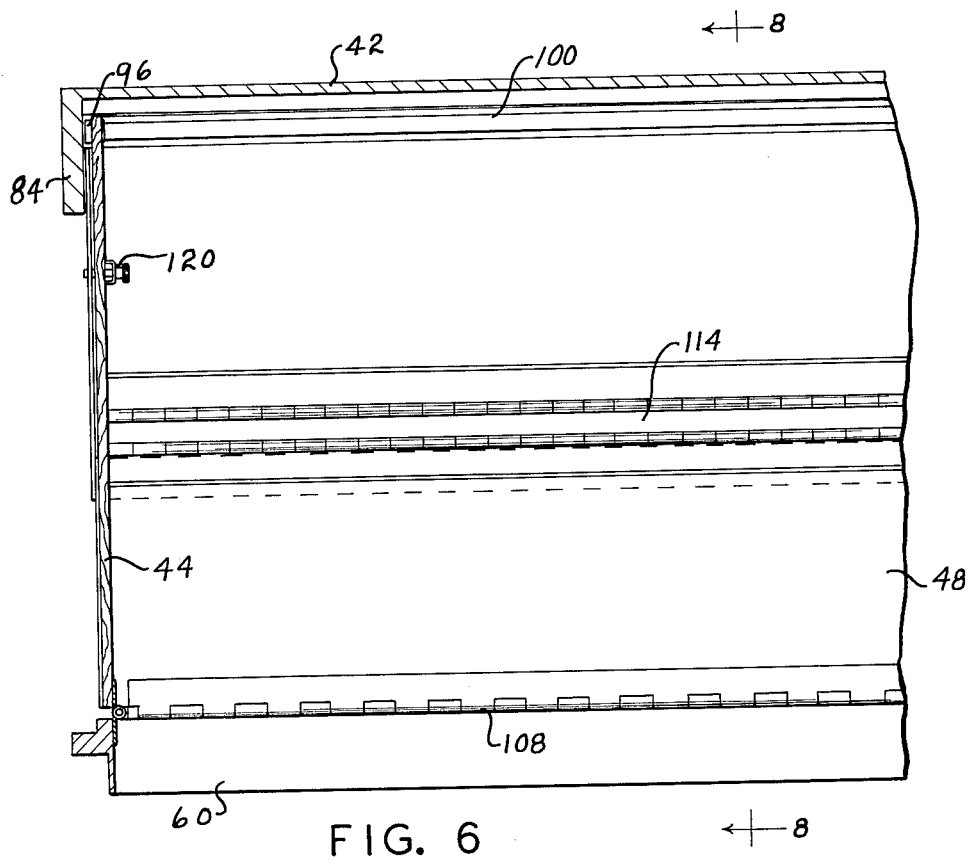
FIGURE 6 is an enlarged fragmentary cross sectional view of the present extensible top, the section being taken on lines 6—6 of FIGURE 5.

Referring more specifically to the drawings and to FIGURE 1 in particular, numeral 20 designates a vehicle on which the present top is mounted, the vehicle shown being a small bus which does not provide sufficient height between the floor and roof for an adult to stand erect. The numeral 22 designates the present extensible top mounted on the vehicle, which, as shown in FIGURE 1, is in folded position providing a low silhouette appearance on the bus. FIGURE 2 illustrates the extensible top in its unfolded position, the position assumed while the bus is parked or otherwise not being driven. The type of vehicle is not important so long as the vehicle roof construction is such that the present extensible top can be mounted thereon; however, the extensible top is adapted primarily for the small vehicles which require the additional head room for the passengers or occupants, the vehicle generally consisting of a body 24, front wheels 26, rear wheels 28, roof 30, door 32 and a plurality of windows 34.

The extensible top consists of a base 40, cover 42, side panels 44 and 46 and end members 48 and 50. The base is constructed of two side members 52 and 54 and two end members 56 and 58 joined to the side members to form a rectangular shaped frame, each member having a downwardly extending flange 60 for extending through an opening in the top of the vehicle to which the base is secured. The upper surface of the frame members of the base is provided with a groove 62 for forming a seal with the cover, as will be more fully explained hereinafter. The side members 52 and 54 are provided with end extensions 64 and 66 connected by end members 68 and 70, respectively, and containing groove 72 for forming a seal with the cover.

Figure 9:
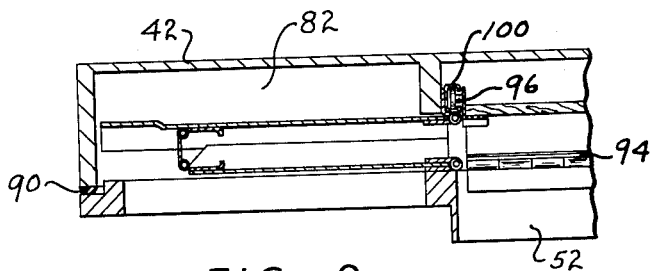
FIGURE 9 is an enlarged fragmentary cross sectional view of the extensible top, the section being taken on line 9—9 of FIGURE 7.

The cover 42 consists of a panel 80 substantially the same size as the overall extensible top and having downwardly extending side flanges 82 and 84, and downwardly extending end flanges 86 and 88 connected to the respective edges of panel 80. The lower edges of flanges 82, 84, 86 and 88 are provided with a gasket 90 for seating in grooves 62 and 72 in the upper edge of the frame members of base 40. Side panels 44 and 46 are pivotally connected to frame members 52 and 54 by hinges 92 and 94 and slidably connected to cover 42 by roller fixtures 95 and 96, the rollers on said fixtures moving in tracks 98 and 100 near each end of cover 42, and the tracks being supported by brackets 102 and 104 secured to the underside of panel 80. The end panels 48 and 50 are pivotally connected to frame members 56 and 58 by hinges 106 and 108 at the bottom and are pivotally connected to the cover by hinges 110 and 112 mounted on the bottom of tracks 98 and 100, respectively. End panels 48 and 50 are hinged at the horizontal center by hinges 114 and 116, respectively, the hinges consisting of a double pivoted type secured at one edge to the lower section and at the other edge to the upper section of the end members. A sealing strip 118 on the lower edge of each upper section extends downwardly over the hinge when the two panels 48 and 50 are unfolded, to form a weather protecting shield over the hinge portion of the two members. The panel 80 of cover 42 extends sufficiently beyond the points at which members 48 and 50 are secured to the cover to completely enclose members 48 and 50 when they are in their folded position, as illustrated in FIGURE 9, thus permitting gasket 90 of the cover to seat in grooves 62 and 72 of the base and effectively seal the entire extensible top structure when it is in folded position, as illustrated in FIGURES 1, 4, 7 and 9.

Figure 12:
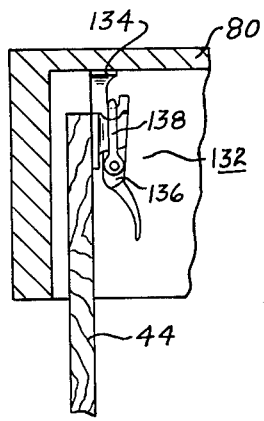
FIGURE 12 is a fragmentary cross sectional view of the extensible top and an elevational view of another latch used to retain the extensible top in its unfolded position, the section being taken on line 12—12 of FIGURE 5.
Figure 13:
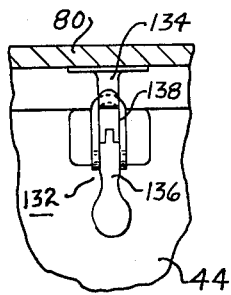
FIGURE 13 is a side elevational view of the latch mechanism shown in FIGURE 12.
Figure 16:
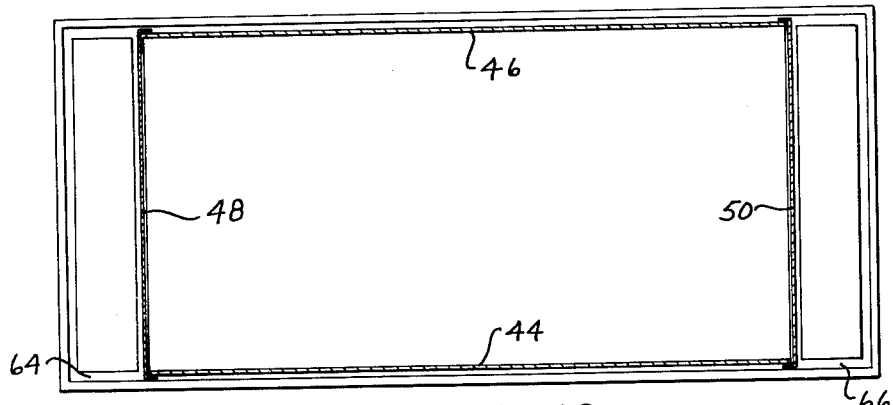
FIGURE 16 is a cross sectional view of the extensible top, the section being taken on line 16—16 of FIGURE 5.
Figure 11:
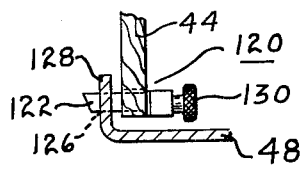
FIGURE 11 is a top plan view of the latch shown in FIGURE 10, the section of the top shown in said figure being taken on line 11—11 of FIGURE 10.
Figure 10:
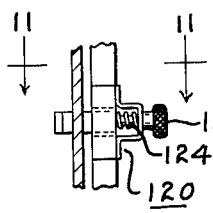
FIGURE 10 is a plan view of one of the latches for retaining the extensible top in its unfolded position, the section being taken on line 10—10 of FIGURE 8.

The extensible top is held rigidly in its unfolded position by a plurality of latches 120 interlocking the side panels 44 and 46 with end members 48 and 50, the latches employing a bolt 122 urged to its locking position by a spring 124 and extending through slot 126 in flange 128 of the end members 48 and 50. An operating handle 130 is provided for withdrawing bolt 122 from slot 126 when the top is being folded. A plurality of locks 132 are also provided along panels 44 and 46 to lock the panels to the cover, as illustrated in FIGURES 12 and 13, these locks consisting of an anchor member 134 and a pivoted member 136 having a link 138 for interlocking with anchor 134, the anchor being secured to the underside of panel 80 and the pivoted portion being mounted on the underside of the side panels. Each of the side panels preferably contains one or more windows 140, the windows preferably being of the type which can be opened and closed by sliding, in order to provide ventilation in the extensible top and air circulation in the vehicle.

Figure 7:
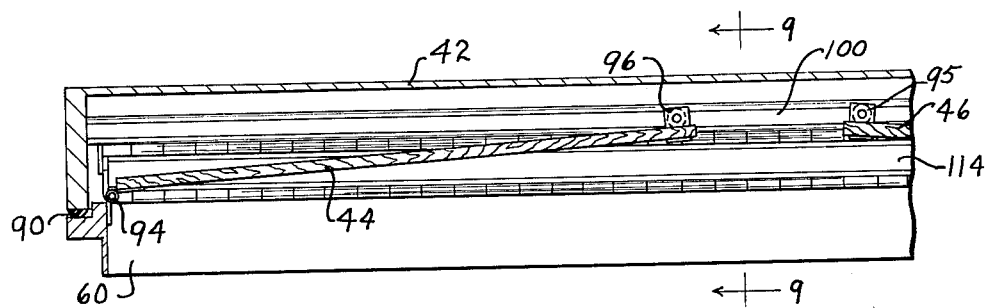
FIGURE 7 is an enlarged fragmentary cross sectional view of the extensible top, the section being taken on line 7—7 of FIGURE 4.
Figure 8:
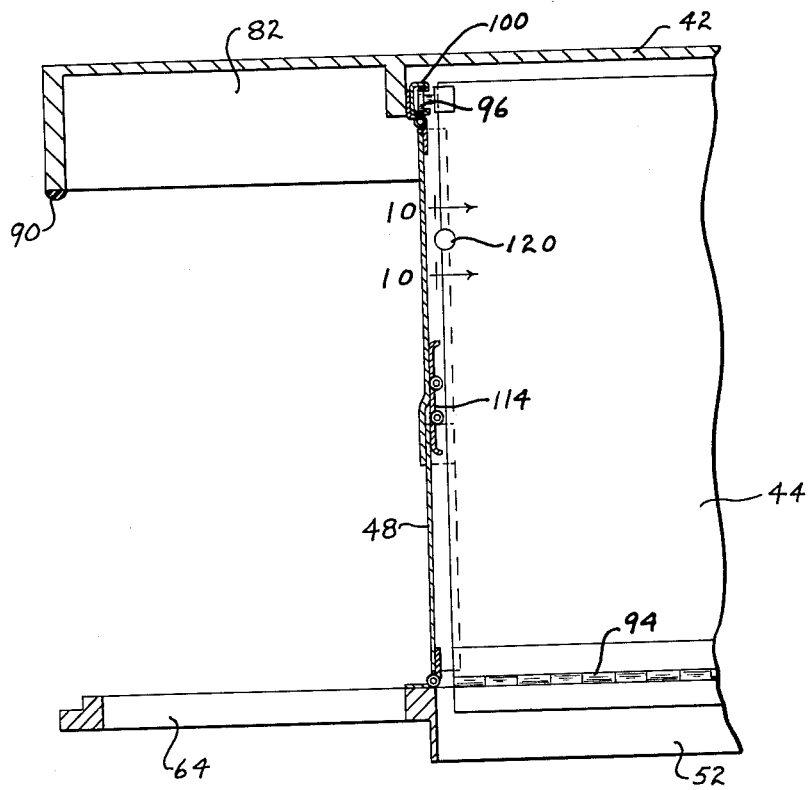
FIGURE 8 is an enlarged fragmentary cross sectional view of the extensible top, the section being taken on line 8—8 of FIGURE 6.

The present extensible top is installed on a conventional small bus-type vehicle by cutting a hole in the top of the vehicle of the size required to receive flanges 52, 54, 56 and 58, and the top is secured to the roof of the vehicle by screws, bolts or other securing means extending through the flanges into the vehicle roof structure. After the extensible top has been installed on the vehicle, it can be conveniently raised and lowered from inside the vehicle by merely lifting cover 42 upwardly. As the cover is lifted, the upper edges of the two side panels 44 and 46 are pushed outwardly until the panels are in vertical position and the end members 48 and 50 automatically move from their folded position, as illustrated in FIGURE 9, to their unfolded position as shown in FIGURE 8. After the cover has been lifted and the side panels and end members are in vertical position, the side panels and end members are locked to one another by latches 120 and the cover is locked to the side panels by latches 132. When the top is folded, the two side panels are moved inwardly and the two end members fold outwardly, permitting cover 42 to descend until gasket 90 seats firmly into grooves 62 and 72, thus completely enclosing the operating parts of the extensible top within the confines of the cover in fluid tight relationship, as illustrated in FIGURES 7 and 9.

While only one embodiment of the present invention has been described in detail herein, various changes and modifications may be made without departing from the scope of the invention.

We claim:

1. An extensible top for a vehicle having a roof, comprising a base having two side frame members and two end frame members, two additional end frame members spaced outwardly from said first two end frame members, grooves in the upper edge of said first and last frame members, a vertically movable cover having a horizontally positioned panel and downwardly extending marginal flanges, a gasket on the lower edges of said flanges for seating in said grooves, side panels pivotally connected at their lower edges to the respective side frame members, horizontally transversely positioned tracks on the underside of the cover disposed at the ends of said side panels, rollers secured to the upper corners of said side panels and disposed in said tracks, windows in said side panels, end panels pivotally secured to the first mentioned end frame members and to the underside of said cover and having an upper and a lower section, a hinge means connecting said upper and lower sections of each end panel for folding said end panels to horizontal position with the hinge means folding outwardly away from the ends of the side panels, said cover and base extending forwardly and rearwardly beyond said end panels sufficiently to completely enclose said end panels when the top is in folded position, and a plurality of latch means interlocking said side and end panels and said side panels and said cover.

2. An extensible top for a vehicle, comprising a base having two side frame members and two end frame members, two additional end frame members spaced outwardly from said first two end frame members, a vertically movable cover having a horizontally positioned panel and downwardly extending marginal flanges, side panels pivotally connected at their lower edges to the respective side frame members, transversely positioned tracks on the underside of the cover disposed at the ends of said side panels, rollers secured to the upper corners of said side panels and disposed in said tracks, windows in said side panels, end panels pivotally secured to the first mentioned end frame members and to the underside of said cover and having an upper and a lower section, a hinge means connecting said upper and lower sections of each end panel for folding said end panels to horizontal position with the hinge means folding outwardly away from the ends of the side panels, said cover and base extending forwardly and rearwardly beyond said end panels sufficiently to completely enclose said end panels when the top is in folded position, and a plurality of latch means interlocking said side and end panels and said side panels and said cover.

3. An extensible top for a vehicle, comprising a base having two side frame members and two end frame members, two additional end frame members spaced outwardly from said first two end frame members, a vertically movable cover having a horizontally positioned panel and downwardly extending marginal flanges, side panels pivotally connected at their lower edges to the respective side frame members, transversely positioned tracks on the underside of the cover disposed at the ends of said side panels, rollers secured to the upper corners of said side panels disposed in said tracks, end panels pivotally secured to the first mentioned end frame members and to the underside of said cover and having an upper and a lower section, and a hinge means connecting said upper and lower sections of each end panel for folding said end panels to horizontal position with the hinge means folding outwardly away from the ends of the side panels, said cover and base extending forwardly and rearwardly beyond said end panels sufficiently to completely enclose said end panels when the top is in folded position.

4. An extensible top for a vehicle, comprising a base having two side frame members and two end frame members, a vertically movable cover having a horizontally positioned panel and downwardly extending marginal flanges, side panels pivotally connected at their lower edges to the respective side frame members, end panels pivotally secured to the first mentioned end frame member and to the underside of said cover and having an upper and a lower section, and a hinge means connecting said upper and lower sections of each end panel for folding said end panels to horizontal position with the hinge means folding outwardly away from the ends of the side panels, said cover and base extending forwardly and rearwardly beyond said end panels sufficiently to completely enclose said end panels when the top is in folded position.

5. An extensible top for a vehicle, comprising a base having two side frame members and two end frame members, a cover, side panels pivotally connected at their lower edges to the respective side frame members, end panels pivotally secured to the end frame members and to the underside of said cover and having an upper and a lower section, and a hinge means connecting said upper and lower sections of each end panel for folding said end panels to horizontal position with the hinge means folding outwardly away from the ends of the side panel, said cover and base extending forwardly and rearwardly beyond said end panels sufficiently to completely enclose said end panels when the top is in folded position.

6. An extensible top for a vehicle, comprising a base, a cover, side panels pivotally connected at their lower edges to the base and slidably connected at their upper corners to the cover, end panels pivotally secured to said base and to the underside of said cover and having an upper and a lower section, and a hinge means connecting said upper and lower sections of each end panel for folding said end panels to horizontal position with the hinge means folding outwardly away from the ends of the side panel, said cover and base extending forwardly and rearwardly beyond said end panels sufficiently to completely enclose said end panels when the top is in folded position.

7. An extensible top for a vehicle, comprising a base structure, a cover structure, side panels pivotally connected to one of said structures, end panels pivotally secured to both of said structures and having an upper and a lower section, and a hinge means connecting said upper and lower sections of each end panel for folding said end panels to horizontal position with the hinge means folding outwardly away from the ends of the side panels, said cover and base structures extending forwardly and rearwardly beyond said end panels sufficiently to completely enclose said end panels when the top is in folded position.

References Cited by the Examiner

UNITED STATES PATENTS

| | | | |
|---|---|---|---|
| 2,483,332 | 9/49 | Brumbaugh | 296—23 |
| 2,890,907 | 6/59 | Briske et al. | 296—23 |
| 3,014,753 | 12/61 | Nagetusch | 296—23 |
| 3,024,059 | 3/62 | Hagenson | 296—23 |
| 3,053,562 | 9/62 | Farber | 296—137 |
| 3,117,820 | 1/64 | Toland et al. | 292—175 X |

FOREIGN PATENTS

| | | |
|---|---|---|
| 839,158 | 6/60 | Great Britain. |
| 840,255 | 6/60 | Great Britain. |
| 900,931 | 6/60 | Great Britain. |

BENJAMIN HERSH, *Primary Examiner.*

A. HARRY LEVY, *Examiner.*